Patented Mar. 28, 1933

1,903,014

UNITED STATES PATENT OFFICE

ROBERT P. MYERS, OF BALTIMORE, MARYLAND, ASSIGNOR TO RESEARCH LABORATORIES OF NATIONAL DAIRY PRODUCTS CORP. INC., OF BALTIMORE, MARYLAND, A CORPORATION OF MARYLAND

UNFERMENTED MILK PRODUCT

No Drawing.  Application filed October 21, 1931. Serial No. 570,253.

This invention relates to an unfermented milk product containing *Lactobacillus acidophilus* and the process of preparing such an article. By *Lactobacillus acidophilus* I mean the organism of this name which can be implanted in the intestinal tract and of which there are many species.

In view of the fact that the present commercial fermented acidophilus milk which is produced by culturing *Lactobacillus acidophilus* in skim milk is distasteful to many people who would like to drink such milk for its therapeutic value, a sweet unfermented acidophilus milk which would contain an effective dosage of viable Lactobacilli and retain its efficacious characteristics and palatable taste over a reasonable period of time, is highly desirable.

The present invention contemplates an unfermented product of this character which will have the required keeping properties in that it may be prepared and delivered to consumers in accordance with usual practice from a central dairy station and wherein the quantity of viable Lactobacilli will remain sufficiently large over a period of several days or more as to constitute a therapeutically effective dosage.

It is, moreover, an object of this invention to provide an unfermented product which may have admixed therewith, or in solution or suspension therein, a nutrient such as chocolate or milk concentrates of the character of malted milk, without in any wise affecting either the viability of the dosage or the keeping property of the beverage.

In carrying out the invention, skim milk from which the casein has been removed by curdling with rennet is the medium used for culturing the *Lactobacillus acidophilus*. A skim milk of good sanitary quality should be used. The skim milk is heated to 100° F. and sufficient rennet is added to produce a firm curd in about 15 minutes. The curd is cut and while the small curds are slowly stirred, the temperature is raised to about 212° F. After the whey has been drained off and filtered through cheese cloth, it is heated to 210°–212° F., and held at this temperature for at least one hour. After filtering the whey is adjusted to pH 7.0–7.5. The whey is left standing overnight and the supernatant liquid siphoned off, the sediment being left in the bottom of the tank.

A vigorous culture of *Lactobacillus acidophilus* of proved therapeutic value, and recently isolated is the organism used. A starter or inoculum of *Lactobacillus acidophilus* is prepared by cultivating the organism in the whey culture medium described above or in one of the whey mediums to be later herein set forth. The starter, after it has been incubated sixteen to twenty-four hours at 37° to 40° C. is added to the main batch of whey. The amount of the starter to be used is from 2 to 10% by volume. The batch is thoroughly mixed and is held at 37° C. to 40° C. for sixteen to twenty-four hours. The *Lactobacillus acidophilus* at the end of this time are present in a concentration of from 300 to 400 million per cubic centimeter. In order to avoid contamination, extreme care must be exercised to handle the culture aseptically.

At the end of the incubation period, the culture is run through a continuous flow centrifuge operated at such a speed that substantially 99+% of the *Lactobacillus acidophilus* is removed from the culture medium and deposited on the bowl of the centrifuge. The centrifugate consisting of *Lactobacillus acidophilus* is carefully scraped from the bowl and is resuspended in boiled water for example boiled tap water, isotonic salt solution or other sterilized liquid medium such as sterilized diluted skim milk or sterilized diluted whey by vigorous agitation. The mixture is centrifugalized as above, the centrifuge being run at such a speed that substantially 99+% of the *Lactobacillus acidophilus* is removed in the form of a concentrate from the wash water. The handling of the culture and the centrifuge must be done in such a way that the material is not contaminated.

As an alternate procedure to the resuspension of the centrifugate in boiled water, or the other mediums above mentioned, for purposes of washing out the acid, I can accomplish the same result by diluting the original whey culture medium preferably with an equal volume of previously boiled and cooled tap water, although one of the other mediums referred to can be used, neutralizing the diluted culture whey to a pH of about 7-7.5 and then centrifugalizing. The occluded acid in the centrifugate is so neutralized and diluted that this treatment yields a centrifugate comparable in quality to the concentrate obtained by resuspension and recentrifugation.

In order to reduce the amount of insoluble material as well as to stimulate growth of the Lactobacilli in the whey medium or the whey medium to which has been added one of the nutrients to be hereinafter described, and thus increase the amount of the centrifugate obtained by centrifugalizing the *Lactobacillus acidophilus* culture, I have found that an enzyme such as pepsin, tripsin, papain and others may be added to the whey medium and allowed to act on the protein before the whey medium is sterilized. For example, in peptic digestion, the whey medium is made acid by the addition of hydrochloric acid, although sulfuric and lactic acids may also be employed and a pH of about 3.4 established. The medium is held at a temperature of about 47° to 50° C. for approximately two hours to allow the pepsin to digest the troublesome protein material which otherwise precipitates as the culture grows. The medium is then neutralized with sodium hydroxide, calcium hydroxide or potassium hydroxide to a pH of about 7-7.5 and sterilized by heating to destroy the enzyme and to prepare a sterile medium for the growth of the culture. The amount of pepsin to be used will vary with the batch under treatment, but I have found amounts ranging between 1 and 10 parts in 100,000 parts of the medium to be satisfactory. By this means, as stated, I am able to reduce the amount of insoluble material more than 50% and the concentration of the Lactobacilli per gram of centrifugate is proportionately increased. That is to say, the stimulated growth and elimination of insoluble matter proceeds to such a degree that the increase in count of Lactobacillus per gram of centrifugate reaches 2 or 3 times and more, over a method where preliminary digestion and sterilization are not resorted to. For example, a gram of centrifugate prepared by this method will contain at least fifty billion viable Lactobacilli.

It will be understood that the centrifugates or concentrates obtained by either of the two methods referred to and either produced from a diluted whey medium as described or resuspended as also set forth constitutes the product which is to be added to the milk.

An excellent quality raw milk should be selected and pasteurized preferably so as to render it as nearly sterile as possible without giving it a cooked flavor. A temperature of 160° F. for half an hour is probably the most satisfactory. The milk is immediately thereafter cooled to below 50° F. and preferably below 40° F.

The centrifugate produced as above according to one procedure is suspended in the raw milk or the whole milk pasteurized as in the preceding paragraph by vigorous agitation and preferably followed by homogenization at a pressure below 1500 but which may reach 2000 pounds. During this process, the milk is kept below 50° F. and after the completion of the suspending operation, the product is preferably just below 50° F. In other words, the milk or milk product is maintained at a temperature to prevent souring of the milk. Where the temperature is not maintained at a sufficiently low point, the growth of the organisms will result, producing lactic acid and acting to sour the milk. By maintaining a sufficiently low temperature, growth of the organisms is inhibited and the formation of lactic acid obviated.

The various concentrates and centrifugates referred to above, which, as stated, are recovered in a highly purified condition, enable the milk to be advantageously produced, since they are free of acids, insoluble matter, i. e., by-products of growth, as well as substances tending to produce a taint or off-flavor. In other words, the concentrates and centrifugates, by reason of their purity, can be combined with the milk while maintained at a low temperature, e. g., below 50° F., as described herein, without fear of producing souring of the milk. That is, there will be no objectionable presence of undesired organisms, or chemical action which will aid the formation of lactic acid and other undesirable compounds.

The finished product at the time of manufacture should contain about three hundred million to five hundred million viable Lactobacilli per cubic centimeter of milk, so as to insure that even after the beverage has been held for forty-eight hours or longer, the count per cubic centimeter will be above the minimum effective dosage, in that it will still have uniformly more than two hundred million viable Lactobacilli per cubic centimeter of milk. This proportion of two hundred million Lactobacilli per cubic centimeter of milk has been described by medical authorities as the minimum therapeutically effective dosage. By dosage, is meant, of course, that each cubic centimeter of the milk contains at least the prescribed minimum count.

In order to produce a quart of milk containing five hundred million viable *Lactobacillus acidophilus* per cc. approximately one and one-half to two quarts of the whey culture will be required, if it be assumed recovery is 99+% efficient and that the culture contained three hundred million to five hundred million viable *Lactobacillus acidophilus* per cubic centimeter of culture. The weight of the semi-solid centrifugate or concentrate to be added to a quart of milk to give the desired count per cubic centimeter will vary and depend on the yield of Lactobacilli obtained in the culture. This yield is influenced by the condition of the medium which, in accordance with this invention, can be enhanced by the steps of preliminary enzymic digestion and sterilization, as well as by treatment or modification with additive agents or nutrients to be later described.

It will be understood that in the use of the process embodying enzymic digestion, the concentration of Lactobacilli in the centrifugate will be increased to such an extent that I have obtained as high as eight hundred million viable Lactobacilli per gram of centrifugate. The centrifugate is thus in high concentrated form and substantially pure, being free from acids, neutralizers and other undesirable flavors and insoluble matter. Such centrifugate in proportionately smaller quantities can be added to a large mass of milk and accomplish the same result where a less purified centrifugate which must be added in a larger quantity is employed. This is due to the fact that the more completely concentrated centrifugate is free from any deleterious substances which would affect the milk, whereas with less purified centrifugates which are less concentrated, there is always the danger of contamination and the quantity of centrifugate added must be proportionately high to maintain the desired count of viable Lactobacilli.

In lieu of preparing the whey culture as above set forth, I employ a suitable whey powder, preferably rennet whey powder, and reconstitute with sufficient water to provide a culture medium of desired concentration. The concentration may, of course, be varied, but I have found that a range up to 10% of the whey powder will provide an excellent culture medium. Preferably, a concentration between 3% and 6% will give very satisfactory results.

The hydrogen ion concentration of the culture medium should be about pH 7-7.5.

I have, moreover, found that malt syrup, of which there are many commercial varieties available, will, when added to the whey culture medium either obtained from the skim milk or from the reconstituted powder, produce a rapid and vigorous growth of the *Lactobacillus acidophilus*. The addition of the malt syrup accelerates the yield to a considerable degree.

Where necessary the malt syrup is previously neutralized so as to produce when added to the whey medium a hydrogen ion concentration having the value of pH 6.0 to pH 6.5. It may also be suitably diluted when required.

On the other hand, the syrup in diluted or undiluted condition may be added to the whey culture medium and the mixture thereafter neutralized to give the desired pH.

In the case of the whey medium, the speed and vigor of the growth and the yield will, of course, vary with the richness or concentration of the medium, and I have found that the growth and yield when the syrup is employed is likewise rapid and augmented in accordance with the amount of syrup added to the whey medium.

The carbohydrate nutrient will be added in the quantity required, which may range up to as high as 10%. Preferably, a whey, malt syrup culture medium in which the concentration of the syrup is about 3% will suffice in most cases to produce the desired accelerated growth and yield. It will be understood that this concentration will be increased or decreased dependent upon various conditions, as for example upon the concentration and richness of the particular whey medium.

It has been found that within the sixteen to twenty-four hour period allotted for incubation there has resulted from the addition of the syrup, an increased yield of Lactobacillus indicating that the syrup produces a more vigorous and rapid growth.

The inoculum is added to the several mediums produced as above and allowed to incubate under the same conditions heretofore recited. At the end of the incubation period, the Lactobacilli are segregated and washed by means of a centrifuge or filter press, or by means of both as hereinbefore alluded to.

It will be understood that the inoculum or starter may be initially cultivated in either of the several mediums described, namely the whey medium from skim milk, the reconstituted whey medium from dehydrated whey, or either of these mediums to which has been added an appropriate amount of malt syrup or other nutrient. In other words, the bacilli may thus become previously acclimated by cultivating in any one of these mediums which will induce a better growth and yield when the inoculum is later introduced into the particular culture medium and incubated.

The milk possesses the advantage that it will have a pleasant taste to anyone to whom milk as such is not unpalatable and notwithstanding the latter condition, the beverage can be admixed or provided with other nutrients to suit a particular taste. Moreover, by the method herein outlined, the preparation can be more carefully controlled. In other words, the use of sterile medium and pure culture eliminate the danger of contamination and essentially aid in assisting the keeping qualities of the product.

Another advantage of the unfermented *Lactobacillus acidophilus* milk resides in the fact that the original lactose content of the milk is present in the sweet milk and has not been fermented into acid. The lactose is of value in maintaining the predominant acidophilus flora. It is even possible to make the milk more beneficial for certain pathological conditions by the addition of an excess of lactose in controlled predetermined amounts. In other words, it is desirable to have present in the milk a lactose content which is sufficient to aid the implantation of the flora in the intestinal tract. As stated, the lactose may be present in amount in the milk to secure this result, or additional lactose may be added, but the amount should not be less than that in the original milk.

The centrifugate above referred to in compressed form or as removed from a filter press, may be commercially distributed by wrapping in tin foil or other suitable container or wrapper such as a soluble or insoluble capsule, whereby fresh dosages of viable Lactobacilli will be available daily. This is possible since the centrifugate freed from the washing fluid has been found to have a remarkable degree of purity, substantially free from acids and undesirable flavors or taints. In this connection, it will be observed that the centrifugates and concentrates are prepared in such a purified state that they may be suspended in the milk without fear of producing souring while the milk is retained at a low temperature.

In connection with the unfermented milk product containing *Lactobacillus acidophilus*, I have found that the addition of various nutrients such as chocolate will have no ill effect upon the keeping qualities. Moreover, a nutrient such as milk concentrates in the nature of powdered malted milk has been found very effective without affecting the viability of the Lactobacilli or the keeping properties of the beverage. As previously stated, these may be suitably admixed with the acidophilus milk either prior to or after the Lactobacilli have been suspended in the milk, and may exist in solution or in suspension therein, being added in either fluid or powdered form.

The unfermented milk product containing *Lactobacillus acidophilus* and with or without such additional nutrients is of milk like consistency and readily palatable.

It will, moreover, be understood that in the process of culturing, the whey constitutes the culture medium and the acid is neutralized or washed from the centrifugate before it is added to the sweet milk, i. e., the centrifugate before it is added to the sweet milk is freed from acid by a process of washing or neutralizing. In this manner, it will be clear that the keeping qualities of the unfermented milk, as well as that of the Lactobacilli will be maintained for relatively long periods which is, of course, of prime importance where the milk is supplied by daily delivery to consumers in the usual manner from a central dairy, or where daily distribution of fresh Lactobacilli in wrapped or capsule form is contemplated.

The centrifuge employed may be relatively large, for plant operation one such as Sharples super-centrifuge being found desirable. In addition a filter press may be utilized in some cases or a combination centrifugal separator and filter press will be found advantageous.

The substantially pure centrifugate produced as herein outlined can be admirably admixed with cream or cottage cheese and sold in this form commercially. The product will be relatively long keeping since the cheese will maintain the Lactobacilli viable.

In addition to the malt syrup above mentioned, I may use other nutrients such as the extracts or syrups from malted grains as barley and rye, also maltose, malt sugar, crude molasses (beet or cane), dextrin, glucose and galactose.

In referring herein to resuspension of the centrifugate, it will, of course, be understood that this will be resorted to where dilution is not desirable.

With further reference to the preparation of the whey medium, whey powder is dissolved in water and the solution heated to 200° to 210° F. and held for 45 minutes without agitation. At the end of this time, it is drained through a decanting tube, so that most of the precipitated protein remains in the tank. This whey solution is filtered through a line filter as it is pumped to the main vat. Peptone is dissolved in water and the solution is filtered as it is added to the solution of whey powder. Diamalt is added as a filtered solution in the same manner. The mixture is thoroughly agitated and a filtered solution of an alkali such as sodium carbonate or sodium hydroxide is added to adjust the reaction to pH 6.6 to 6.8. The final mixture is then sterilized by heating at 10 pounds pressure for 20 minutes. After the medium is cooled, it is ready for inoculation. The various ingredients may be mixed in heated or cooled condition but preferably the culture medium is prepared by having the various members warm.

Instead of preparing the medium as just described, the final mixture may be filtered through a filter press just prior to sterilization.

The ingredients of the culture medium are preferably:

| | Per cent |
|---|---|
| Whey powder | 5 |
| Peptone | .25 |
| Diamalt | .50 |
| Water to make | 100 |

Adjust final reaction pH 6.6 to 6.8 with alkali as described if required.

In lieu of the whey powder above referred to, fresh rennet whey which has not soured is equally preferable as the base of the medium, but because of the simplicity in handling, I have adopted whey powder.

A further medium which is equally valuable both in nutritive properties and with respect to the amount and kind of sediment obtained in the centrifugation process is the following:

| | Per cent |
|---|---|
| Whey powder | 10 |
| Tomato juice | 10 |
| Peptone | .5 |
| Water to make | 100 |

Adjust to reaction pH 6.6 to 6.8 with alkali as described if required.

The various ingredients may be filtered before mixing as desired and the final mixture is preferably filtered through a filter press after it has been heated at 15 pounds pressure for 16 minutes. After the filtration, the mixture is sterilized in pressure tanks at 10 to 15 pounds pressure for 20 minutes.

A further culture medium may be prepared by using ingredients in the following manner:

Whey powder, 5 to 10%, wheat germ (aqueous extract) from 10 to 20 grams to 100 grams of whey, water to make, 100%. Adjust to reaction pH 6.6 to 7.0 with alkali as described if required.

The ingredients may be each filtered before addition to the mixture or subsequently heated, filtered and sterilized.

After sterilization of any of the several culture mediums above referred to, they are cooled to preferably 98° F. and inoculated with 2% of a vigorous 16 hour old culture. This is preferably the same pure strain obtained as above described.

The culture is incubated for 18 to 20 hours at 98° F. or until such time as the titratable acidity has increased by an amount of about 1 to 1.2%. At this time the count of viable *Lactobacillus acidophilus* in the culture should be about 500 million per cc.

The culture is then diluted with a volume of water equal to about 50% of the culture by volume and which contains sufficient sodium hydroxide or other alkali such as sodium carbonate to bring the reaction of the mixture to about pH 6.8 to pH 7.2. It is preferred that the alkaline solution be first filtered and sterilized before adding to the culture.

In some cases I have continuously neutralized the culture by adding small amounts of alkali or suitable neutralizing agent from time to time. In such practice it is usually unnecessary to add a neutralizing agent when the culture is diluted as just described.

The mixture should be cooled to 50°–60° F. and is then centrifugalized at such a speed that 99+% of the cells of the *Lactobacillus acidophilus* will be removed from the culture and deposited on the bowl of the centrifuge. Too high a speed of the centrifuge produces a centrifugate which is too dry to suspend easily. The centrifugate is removed from the bowl, mixed with a weight of sterile skim milk equal to substantially 50% of the weight of the centrifugate, and the mixture vigorously agitated by shaking or stirring until a homogeneous mass is obtained.

While I have described the use of sterile skim milk equal to substantially 50% of the weight of the centrifugate, it will be understood that this may be increased or decreased as desired. In some cases a paste will be made whereas in other cases a thin flowable suspension will be found more desirable.

In referring to sterile skim milk I of course mean a sweet milk, that is, one which has not been fermented.

This concentrate in skim milk obtained as above, is suspended in the milk to the desired numbers and should be kept cold preferably below 35–40° F. at all times. I have found that the concentrate obtained from 100 gallons of culture may be used to prepare 100 gallons of sweet acidophilus milk. The concentrate is preferably added to the skim milk while the latter is cooled, that is, below substantially 35–40° F., although this is not essential since the concentrate is substantially free from contaminating influences when prepared in accordance with this invention.

In preparing the milk to which the concentrate is added by a further process a good quality whole milk is first homogenized at 2000 pounds pressure, then preferably pasteurized at 145°–150° F. for 30 minutes. The proper amount of concentrate to give a therapeutically effective dosage is added to the milk which is maintained at a temperature of 35 to 40° F. and thoroughly suspended throughout by vigorous agitation by some suitable stirring device.

It is highly desirable that the milk be kept cold after the addition of the concentrate. If the sweet acidophilus milk is of good sanitary quality and has been properly pasteurized, it will remain sweet and pure for more than a week, if kept at 35 to 40° F. Care should be exercised to prevent the milk from warming up during the bottling process and subsequent handling and it is desirable that extreme sanitary precautions prevail throughout the process.

It will be understood that I may prepare a culture medium of whey powder or fresh rennet whey as described.

Where the whey powder is used, of course, a solution of appropriate concentration is prepared. As additives to this base I may utilize peptone, diamalt, tomato juice, wheat germ extract and hydrolyzed casein.

I may use the whey base with peptone and diamalt or with tomato juice and wheat germ extract as described. I may combine all of the substances just mentioned in one culture medium or any one or more of them.

I prefer to use a culture from a pure strain as hereindescribed, but of course I may use also cultures from mixed strains.

In any event, the culture is free of acids and by-products of growth which would have a tendency to produce contamination and sour the product. This is an important feature of the present invention in that it enables the product to be kept for long periods of time and hence enables its distribution by usual milk service.

This application is a continuation in part of my co-pending application Serial No. 444,864.

What I claim is:

1. The process of making a sweet unfermented acidophilus milk of milk-like consistency which comprises homogenizing sweet milk, pasteurizing, and suspending in the homogenized, pasteurized milk *Lactobacillus acidophilus* in numbers to produce a therapeutically effective product and maintaining the milk at a temperature sufficiently low to inhibit growth of the organisms and formation of lactic acid and prevent souring of the milk.

2. The process of making a sweet unfermented acidophilus milk of milk-like consistency which comprises preparing a concentrate of *Lactobacillus acidophilus* substantially free of acids and by-products of growth, and suspending the same by agitation in homogenized and pasteurized sweet milk maintained at a temperature sufficiently low to inhibit growth of the organisms and formation of lactic acid and prevent souring of the milk.

In testimony whereof I affix my signature.

ROBERT P. MYERS.